(12) United States Patent
Usami

(10) Patent No.: US 11,281,134 B2
(45) Date of Patent: *Mar. 22, 2022

(54) TEMPERATURE CONTROL DEVICE AND IMAGE FORMING APPARATUS

(71) Applicant: TOSHIBA TEC KABUSHIKI KAISHA, Tokyo (JP)

(72) Inventor: Yutaka Usami, Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/136,269

(22) Filed: Dec. 29, 2020

(65) Prior Publication Data

US 2021/0364956 A1 Nov. 25, 2021

(30) Foreign Application Priority Data

May 25, 2020 (JP) .............................. JP2020-090712

(51) Int. Cl.
*G03G 15/20* (2006.01)

(52) U.S. Cl.
CPC ..... *G03G 15/2039* (2013.01); *G03G 15/2057* (2013.01); *G03G 15/2064* (2013.01)

(58) Field of Classification Search
CPC ........... G03G 15/2039; G03G 15/2057; G03G 15/2064
See application file for complete search history.

(56) References Cited

U.S. PATENT DOCUMENTS

| 11,003,117 | B1* | 5/2021 | Ota | G03G 15/2039 |
| 2003/0039480 | A1* | 2/2003 | Omoto | G03G 15/2039 399/69 |
| 2009/0297199 | A1* | 12/2009 | Yamashina | G03G 15/2039 399/70 |
| 2012/0224878 | A1* | 9/2012 | Ikebuchi | G03G 15/2039 399/70 |

FOREIGN PATENT DOCUMENTS

| JP | S59-033055 U | 2/1984 |
| JP | S63-202776 A | 8/1988 |
| JP | 2002-116658 A | 4/2002 |
| JP | 2008-145788 A | 6/2008 |

* cited by examiner

*Primary Examiner* — Sandra Brase
(74) *Attorney, Agent, or Firm* — Foley & Lardner LLP

(57) ABSTRACT

A temperature control device controls a temperature of a temperature control target to which heat propagates from a heater by supplying power to the heater and includes a control circuit. The control circuit includes a temperature estimation unit and a control signal generation unit. The temperature estimation unit estimates the temperature of the temperature control target based on conduction to the heater. The control signal generation unit outputs a conduction pulse for controlling power to be supplied to the heater based on a temperature estimation result and a temperature detection result of the temperature control target by a temperature sensor.

20 Claims, 6 Drawing Sheets

TEMPERATURE CONTROL DEVICE AND IMAGE FORMING APPARATUS

CROSS-REFERENCE TO RELATED APPLICATION

This application claims the benefit of priority from Japanese Patent Application No. 2020-090712, filed on May 25, 2020, the entire contents of which are incorporated herein by reference.

FIELD

Embodiments described herein relate generally to a temperature control device and an image forming apparatus.

BACKGROUND

An image forming apparatus includes a fixing unit that fixes a toner image to a printing medium by causing the fixing unit to apply heat and pressure to the printing medium. A fixing unit includes a fixing rotator (heat roller), a pressure member (press roller), a heating member (a lamp, an IH heater, or the like), and a temperature sensor. The temperature sensor detects a temperature of the surface of the heat roller.

A controller that controls the fixing unit controls the fixing unit such that a surface temperature of the heat roller reaches a target value by increasing or decreasing a conduction amount of a heater based on a detection signal of a temperature sensor (a temperature sensor signal).

If a deviation (or a time lag) occurs between a temperature detected by the temperature sensor and a surface temperature of the heat roller, there is a possibility of overshoot, temperature ripple, or the like occurring.

DETAILED DESCRIPTION

In order to prevent overshoot and temperature ripple from occurring, a temperature sensor with good responsiveness (for example, a thermopile) is necessary. However, there is a problem that the cost of a temperature sensor with good responsiveness is high. In general, the present disclosure provides for an exemplary embodiment of a temperature control device and an image forming apparatus capable of reducing cost and preventing overshoot and temperature ripple from occurring.

According to one embodiment, a temperature control device (e.g., temperature controller) controls a temperature of a temperature control target to which heat propagates from a heater by supplying power to the heater and includes a temperature estimation unit and a control signal generation unit. The temperature estimation unit estimates the temperature of the temperature control target based on conduction to the heater. The control signal generation unit outputs a conduction pulse for controlling power to be supplied to the heater based on a temperature estimation result and a temperature detection result of the temperature control target by a temperature sensor.

Hereinafter, a temperature control device and an image forming apparatus according to an embodiment will be described with reference to the drawings.

Figure 1:
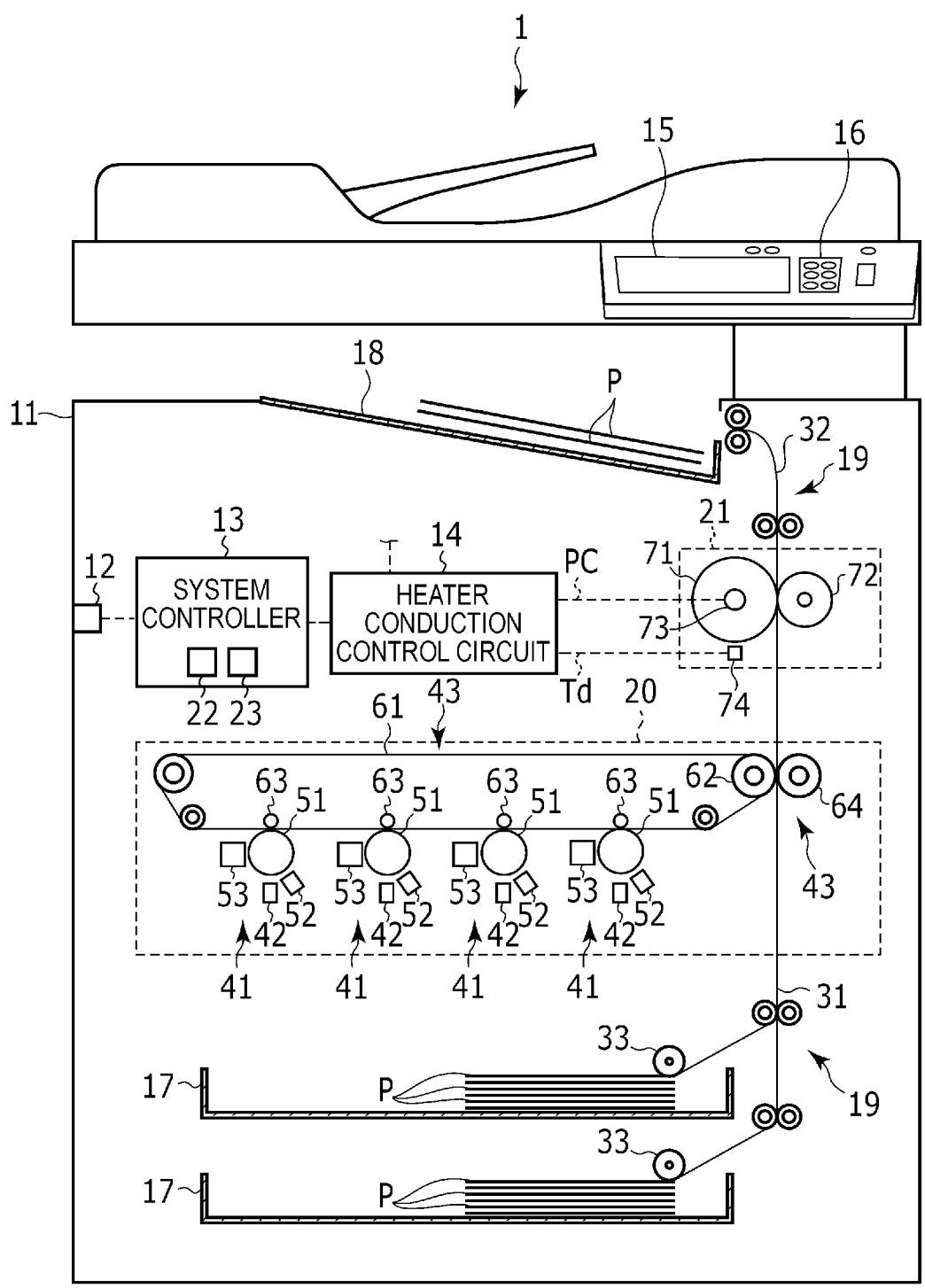
FIG. 1 is a diagram illustrating an example of a configuration of an image forming apparatus according to an embodiment.

FIG. 1 is a diagram illustrating an example of a configuration of an image forming apparatus 1 according to an embodiment.

The image forming apparatus 1 is, for example, a multi-function printer (MFP) that performs various processes such as image forming while conveying a recording medium such as a printing medium. The image forming apparatus 1 is, for example, a solid-state scanning type printer (or example, an LED printer) that scans an LED array performing various processes such as image forming while conveying a recording medium such as a printing medium.

For example, the image forming apparatus 1 has a configuration in which toner is received from toner cartridges and an image is formed on a printing medium with the received toner. The toner may be monochromic toner or may be color toner of colors such as cyan, magenta, yellow, and black, for example. The toner may be decolorable toner with which color is decolored if heat is applied.

As illustrated in FIG. 1, the image forming apparatus 1 includes a casing 11, a communication interface 12, a system controller 13, a heater conduction control circuit 14, a display unit 15 (e.g., a display), an operation interface 16, a plurality of paper trays 17, a discharging tray 18, a conveyance unit 19 (e.g., a conveyor), an image forming unit 20, and a fixing unit 21.

The casing 11 is a body of the image forming apparatus 1. The casing 11 holds the communication interface 12, the system controller 13, the heater conduction control circuit 14, the display unit 15, the operation interface 16, the plurality of paper trays 17, the discharging tray 18, the conveyance unit 19, the image forming unit 20, and the fixing unit 21.

First, a configuration of a control system of the image forming apparatus 1 will be described.

The communication interface 12 is an interface that communicates with other devices. The communication interface 12 is used to communicate with, for example, a host device (an external device). The communication interface 12 is configured as, for example, a LAN connector. The communication interface 12 may perform wireless communication with other devices in conformity with a standard such as Bluetooth (registered trademark) or Wi-Fi (registered trademark).

The system controller 13 controls the image forming apparatus 1. The system controller 13 includes, for example, a processor 22 and a memory 23.

The processor 22 is an arithmetic element that performs an arithmetic operation. The processor 22 is, for example, a CPU. The processor 22 performs various processes based on data such as programs stored in the memory 23. The processor functions as a control unit that can perform various operations by executing programs stored in the memory 23.

The memory 23 is a storage medium that stores programs and data or the like used for the programs. The memory 23 functions as a working memory. That is, the memory 23 temporarily stores data which is being processed by the processor 22 and programs or the like executed by the processor 22.

The processor 22 performs various kinds of information processing by executing programs stored in the memory 23. For example, the processor 22 generates a printing job based on an image acquired from an external device via the communication interface 12. The processor 22 stores the generated printing job in the memory 23.

The printing job includes image data indicating an image to be formed on a printing medium P. The image data may be data for forming the image on one printing medium P or may be data for forming an image on the plurality of printing media P. Further, the printing job includes information indicating whether printing is color printing or monochromic printing. Further, the printing job may include information such as the number of printings (the set number of pages) or the number of printings (the number of pages) per copy.

The processor 22 generates printing control information for controlling operations of the conveyance unit 19, the image forming unit 20, and the fixing unit 21 based on the generated printing job. The printing control information includes information indicating a timing of notification. The processor 22 supplies the printing control information to the heater conduction control circuit 14.

The processor 22 functions as a controller (an engine controller) that controls operations of the conveyance unit 19 and the image forming unit 20 by executing programs stored in the memory 23. That is, the processor 22 performs control such that, for example, the conveyance unit 19 controls conveyance of the printing medium P and the image forming unit 20 controls forming of an image on the printing medium P.

The image forming apparatus 1 may include an engine controller separate from the system controller 13. In this case, the engine controller performs control such that, for example, the conveyance unit 19 controls conveyance of the printing medium P and the image forming unit 20 controls forming of an image on the printing medium P. In this case, the system controller 13 supplies information necessary for control by the engine controller to the engine controller.

The image forming apparatus 1 includes a power conversion circuit (not illustrated) that supplies a direct-current voltage to various configurations in the image forming apparatus 1 using an alternating-current voltage of an alternating-current power source AC. The power conversion circuit supplies a direct-current voltage necessary for operations of the processor 22 and the memory 23 to the system controller 13. The power conversion circuit supplies a direct-current voltage necessary to form an image to the image forming unit 20. The power conversion circuit supplies a direct-current voltage necessary to convey a printing medium to the conveyance unit 19. The power conversion circuit supplies a driving direct-current voltage for a heater of the fixing unit 21 to the heater conduction control circuit 14.

The heater conduction control circuit 14 is a temperature control device (a temperature control unit) that controls conduction to the heater of the fixing unit 21 to be described below. The heater conduction control circuit 14 generates conduction power PC for conducting the heater of the fixing unit 21 and supplies the conduction power PC to the heater of the fixing unit 21. The detailed description of the heater conduction control circuit 14 will be described below.

The display unit 15 includes a display that displays a screen in accordance with a video signal input from the system controller 13 or a display control unit such as a graphic controller (not illustrated). For example, screens for various kinds of setting of the image forming apparatus 1 are displayed on the display of the display unit 15.

The operation interface 16 is connected to an operation member (not illustrated). The operation interface 16 supplies an operation signal in response to an operation of the operation member to the system controller 13. The operation member is, for example, a touch sensor, a numeric key, a power key, a paper feeding key, various functional keys, or a keyboard. The touch sensor acquires information indicating a position designated in a certain area. The touch sensor is configured as a touch panel integrated with the display unit 15 and inputs a signal indicating a position touched on a screen displayed on the display unit 15 to the system controller 13.

The plurality of paper trays 17 are cassettes that hold the printing media P. The paper tray 17 is configured to be able to supply the printing medium P from the outside of the casing 11. For example, the paper tray 17 is configured to be taken out from the casing 11.

The discharging tray 18 is a tray supporting the printing medium P discharged from the image forming apparatus 1.

Next, a configuration of the image forming apparatus 1 conveying the printing medium P will be described.

The conveyance unit 19 is a mechanism that conveys the printing medium P inside the image forming apparatus 1. As illustrated in FIG. 1, the conveyance unit 19 includes a plurality of conveyance paths. For example, the conveyance unit 19 includes a feeding conveyance path 31 and a discharging conveyance path 32.

The feeding conveyance path 31 and the discharging conveyance path 32 are each configured by a plurality of motors, a plurality of rollers, and a plurality of guides (none of which is illustrated). The plurality of motors rotate rollers interlocked with rotation of shafts by rotating the shafts under the control of the system controller 13. The plurality of rollers are rotated to move the printing medium P. The plurality of guides control a conveyance direction of the printing medium P.

The feeding conveyance path 31 picks up the printing medium P from the paper tray 17 and supplies the picked-up printing medium P to the image forming unit 20. The feeding conveyance path 31 includes a pickup roller 33 corresponding to each paper tray. Each pickup roller 33 picks up the printing medium P of each paper tray 17 to the feeding conveyance path 31.

The discharging conveyance path 32 is a conveyance path along which the printing medium P on which an image is formed discharges from the casing 11. The printing medium P discharged by the discharging conveyance path 32 is supported by the discharging tray 18.

Next, the image forming unit 20 will be described.

The image forming unit 20 is configured to form an image on the printing medium P. Specifically, the image forming unit 20 forms an image on the printing medium P based on the printing job generated by the processor 22.

The image forming unit 20 includes a plurality of processing units 41 (e.g., printing processors), a plurality of exposure units (exposers) 42, and a transfer mechanism 43. The image forming unit 20 includes the exposure unit 42 for each processing unit 41. The plurality of processing units 41 and the plurality of exposure units 42 have the same configuration. Therefore, one processing unit 41 and one exposure unit 42 will be described.

First, the processing unit 41 will be described.

The processing unit 41 is configured to form a toner image. For example, the plurality of processing units 41 are each provided for each kind of toners. For example, the plurality of processing units 41 respectively correspond to color toner such as cyan, magenta, yellow, and black. Specifically, a toner cartridge that has different color toner is connected to each processing unit 41.

The toner cartridge includes a toner container and a toner sending mechanism. The toner container is a container that contains toner. The toner sending mechanism is a mechanism including a screw that sends the toner inside the toner container.

The processing unit 41 includes a photosensitive drum 51, an electrostatic charger 52, and a developing unit 53.

The photosensitive drum 51 is a photoreceptor that includes a cylindrical drum and a photosensitive layer formed on the outer circumferential surface of the drum. The photosensitive drum 51 is rotated at a constant speed by a driving mechanism (not illustrated).

The electrostatic charger 52 evenly charges the surface of the photosensitive drum 51. For example, the electrostatic charger 52 charges the photosensitive drum 51 with a constant negative potential (a contrast potential) by applying a voltage (a development bias voltage) to the photosensitive drum 51 using a charging roller. The charging roller is rotated with a predetermined pressure applied to the photosensitive drum 51 with rotation of the photosensitive drum 51.

The developing unit 53 is a device that adheres the toner to the photosensitive drum 51. The developing unit 53 includes a developer container, a mixing mechanism, a development roller, a doctor blade, and an auto-toner control (ATC) sensor.

The developer container is a container that receives the toner sent from the toner cartridge and holds the toner. Carriers are held in advance in the developer container. The toner sent from the toner cartridge is mixed with the carriers by the mixing mechanism to form the developer in which the toner and the carriers are mixed. The carriers are contained in the developer container if the developing unit 53 is manufactured.

The development roller is rotated inside the developer container to adhere the developer to the surface of the development roller. The doctor blade is a member that is provided away from the surface of the development roller at a predetermined interval. The doctor blade removes a part of the developer adhered to the surface of the development roller which is being rotated. Thus, a layer of the developer with a thickness in accordance with an interval between the doctor blade and the surface of the developer roller is formed on the surface of the developing roller.

The ATC sensor is, for example, a magnetic flux sensor that includes a coil and detects a voltage value generated in the coil. The voltage detected by the ACT sensor varies due to density of a magnetic flux from the toner inside the developer container. That is, the system controller 13 determines a density ratio (a toner density ratio) of the toner remaining in the developer container to the carriers based on the voltage detected by the ATC sensor. The system controller 13 operates a motor (not illustrated) that drives the sending mechanism of the toner cartridge based on the toner density ratio and causes the toner to be sent from the toner cartridge to the developer container of the developing unit 53.

Next, the exposure unit 42 will be described.

The exposure unit 42 includes a plurality of light-emitting elements. The exposure unit 42 forms a latent image on the photosensitive drum 51 by emitting light from the light-emitting elements to the charged photosensitive drum 51. The light-emitting elements, for example, are light-emitting diodes (LEDs). One light-emitting element is configured to emit light to one point on the photosensitive drum 51. The plurality of light-emitting elements are arrayed in a main scanning direction which is a direction parallel to a rotation shaft of the photosensitive drum 51.

The exposure unit 42 forms a latent image corresponding to one line on the photosensitive drum 51 by causing the plurality of light-emitting elements arrayed in the main scanning direction to emit light to the photosensitive drum 51. Further, the exposure unit 42 forms latent images of a plurality of lines by continuously radiating light to the photosensitive drum 51 which is rotating.

In this configuration, if the light is emitted from the exposure unit 42 to the surface of the photosensitive drum 51 charged by the electrostatic charger 52, an electrostatic latent image is formed. If the layer of the developer formed on the surface of the developing roller approaches the surface of the photosensitive drum 51, the toner contained in the developer is adhered to the latent image formed on the surface of the photosensitive drum 51. In this way, the toner image is formed on the surface of the photosensitive drum 51.

Next, the transfer mechanism 43 will be described.

The transfer mechanism 43 is configured to transfer the toner image formed on the surface of the photosensitive drum 51 to the printing medium P.

The transfer mechanism 43 includes, for example, a primary transfer belt 61, a secondary transfer counter roller 62, a plurality of primary transfer rollers 63 and a secondary transfer roller 64.

The primary transfer belt 61 is an endless belt wound on the secondary transfer counter roller 62 and a plurality of winding rollers. The inner surface (inner circumferential surface) of the primary transfer belt 61 is brought into contact with the secondary transfer counter roller 62 and the plurality of winding rollers and the outer surface (outer circumferential surface) of the primary transfer belt 61 faces the photosensitive drum 51 of the processing unit 41.

The secondary transfer counter roller 62 is rotated by a motor (not illustrated). The secondary transfer counter roller 62 is rotated to convey the primary transfer belt 61 in a predetermined conveyance direction. The plurality of winding rollers are configured to be rotatable freely. The plurality of winding rollers are rotated with movement of the primary transfer belt 61 by the secondary transfer counter roller 62.

The plurality of primary transfer rollers 63 are configured to bring the primary transfer belt 61 into contact with the photosensitive drums 51 of the processing units 41. The plurality of primary transfer rollers 63 are provided to correspond to the photosensitive drums 51 of the plurality of processing units 41. Specifically, the plurality of primary transfer rollers 63 are provided at positions at which the primary transfer rollers 63 face the photosensitive drums 51 of the corresponding processing units 41 with the primary transfer belt 61 interposed therebetween. The primary transfer rollers 63 come into contact with the inner circumferential surface of the primary transfer belt 61 to displace the primary transfer belt 61 toward the photosensitive drums 51. Thus, the primary transfer rollers 63 bring the outer circumferential surface of the primary transfer belt 61 into contact with the photosensitive drums 51.

The secondary transfer roller 64 is provided at a position facing the primary transfer belt 61. The secondary transfer roller 64 is brought into contact with the outer circumferential surface of the primary transfer belt 61 to apply pressure. Thus, a transfer nip in which the secondary transfer roller 64 and the outer circumferential surface of the primary transfer belt 61 are brought into close contact with each other is formed. The secondary transfer roller 64 tightly presses the printing medium P passing through the transfer nip against the outer circumferential surface of the primary transfer belt 61 as the printing medium P passes through the transfer nip.

The secondary transfer roller 64 and the secondary transfer counter roller 62 are rotated to convey the printing medium. P supplied from the feeding conveyance path 31 with the printing medium P interposed therebetween. In this way, the printing medium P passes through the transfer nip.

In the above configuration, if the outer circumferential surface of the primary transfer belt 61 is brought into contact with photosensitive drums 51, the toner images formed on the surfaces of the photosensitive drums are transferred to the outer circumferential surface of the primary transfer belt 61. If the image forming unit 20 includes the plurality of processing units 41, the primary transfer belt 61 accepts the toner images from the photosensitive drums 51 of the plurality of processing units 41. The toner images transferred to the outer circumferential surface of the primary transfer belt 61 are conveyed by the primary transfer belt 61 to the transfer nip in which the secondary transfer roller 64 and the outer circumferential surface of the primary transfer belt 61 are brought into close contact with each other. If the printing medium P is in the transfer nip, the toner images transferred to the outer circumferential surface of the primary transfer belt 61 are transferred to the printing medium P in the transfer nip.

Next, a fixing configuration of the image forming apparatus 1 will be described.

The fixing unit 21 fixes the toner image to the printing medium P to which the toner image is transferred. The fixing unit 21 operates under the control of the system controller 13 and the heater conduction control circuit 14. The fixing unit 21 includes a fixing rotator, a pressurization member, and a heating member. The fixing rotator is, for example, a heat roller 71. The pressurization member is, for example, a press roller 72. The heating member is, for example, a heater 73 that heats the heat roller 71. Further, the fixing unit 21 includes a temperature sensor (a thermal sensor) 74 that detects a temperature of the surface of the heat roller 71.

The heat roller 71 is a fixing rotator rotated by a motor (not illustrated). The heat roller 71 includes a core bar formed of a hollow metal and an elastic layer formed on the outer circumferential surface of the core bar. In the heat roller 71, the inside of the core bar is heated by the heater 73 disposed inside the core bar formed in a hollow state. The heat generated inside the core bar is transmitted to the outside surface (that is, the surface of the elastic layer) of the heat roller 71.

The press roller 72 is provided at a position facing the heat roller 71. The press roller 72 includes a core bar formed of a metal with a predetermined outer diameter and an elastic layer formed on the outer circumference of the core bar. The press roller 72 adds pressure to the heat roller 71 because of a stress added from a tension member (not illustrated). If the pressure is added from the press roller 72 to the heat roller 71, the nip (the fixing nip) in which the press roller 72 and the heat roller 71 are in close contact with each other is formed. The press roller 72 is rotated by a motor (not illustrated). The press roller 72 is rotated to move the printing medium P entering the fixing nip and tightly presses the printing medium P against the heat roller 71.

The heater 73 is a device that generates heat by the conduction power PC supplied from the heater conduction control circuit 14. The heater 73 is, for example, a halogen heater. The heater 73 is conducted to a halogen lamp heater in which the conduction power PC is supplied from the heater conduction control circuit 14 to heat the inside of the core bar of the heat roller 71 by electromagnetic waves radiated from the halogen lamp heater. The heater 73 may be, for example, an IH heater.

The temperature sensor 74 detects a temperature of the air near the surface of the heat roller 71. The number of temperature sensors 74 may be plural. For example, the plurality of temperature sensors 74 may be arrayed in parallel to the rotation shaft of the heat roller 71. The temperature sensor 74 may be provided at a position at which a change in the temperature of the heat roller 71 can be detected at least. The temperature sensor 74 supplies a temperature detection signal Td indicating a detection result to the heater conduction control circuit 14.

In the above configuration, the heat roller 71 and the press roller 72 add heat and pressure to the printing medium P passing the fixing nip. The toner on the printing medium P is melted by the heat given from the heat roller 71 and is coated to the surface of the printing medium P by the pressure given by the heat roller 71 and the press roller 72. Thus, the toner image is fixed to the printing medium P passing through the fixing nip. The printing medium P passing the fixing nip is introduced to the discharging conveyance path 32 and is discharged to the outside of the casing 11.

Next, the heater conduction control circuit 14 will be described.

The heater conduction control circuit 14 controls the conduction of the heater 73 of the fixing unit 21. The heater conduction control circuit 14 generates the conduction power for conducting the heater 73 of the fixing unit 21 and supplies the conduction power PC to the heater 73 of the fixing unit 21.

Figure 2:
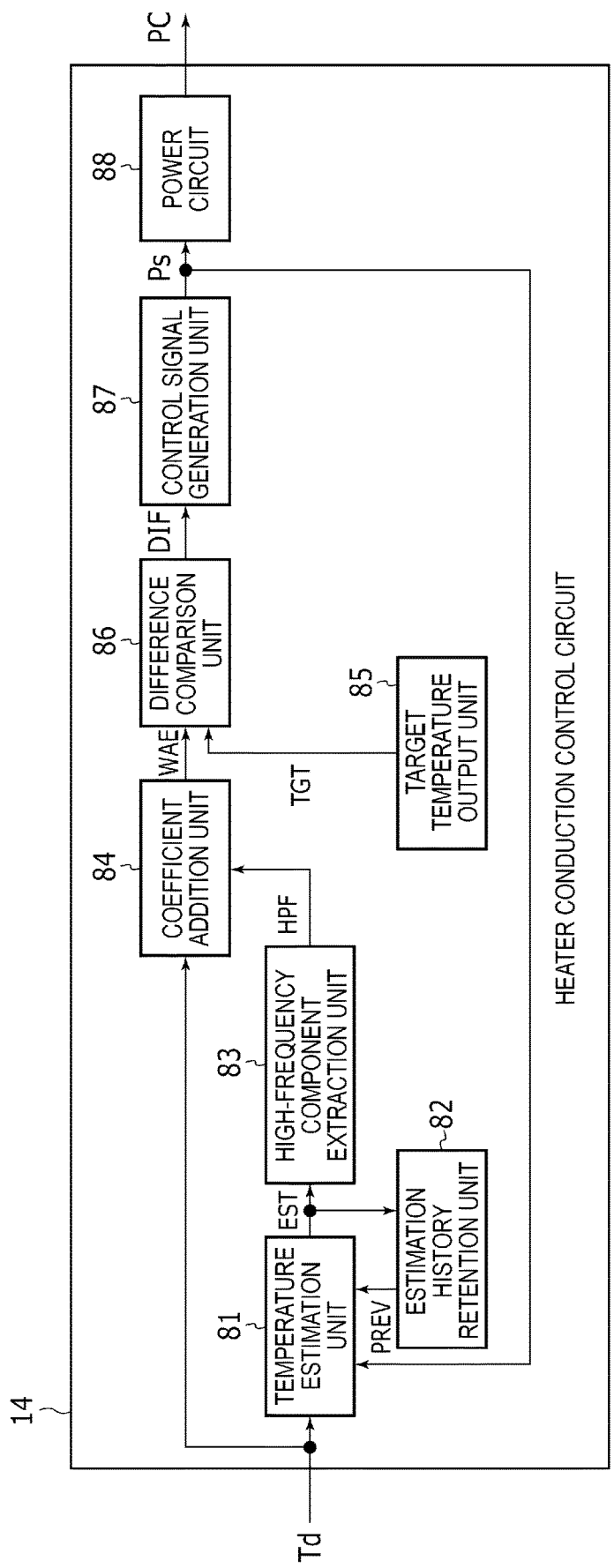
FIG. 2 is a diagram illustrating an example of a configuration of a heater conduction control circuit.

As illustrated in FIG. 2, the heater conduction control circuit 14 includes a temperature estimation unit 81, an estimated temperature memory 82 (e.g., a register), a high-frequency component extraction unit 83, high pass filter unit 83, a two-signal mixing unit 84, a target temperature setting unit 85, a difference detection unit 86, a control signal generation unit 87, and a power circuit 88. The temperature detection result Td is input from the temperature sensor 74 to the heater conduction control circuit 14.

The temperature estimation unit 81 performs a temperature estimation process of estimating the temperature of the surface of the heat roller 71. The temperature detection result Td from the temperature sensor 74, an estimation history PREV from the estimated temperature memory 82 to be described below, and a control signal (e.g., conduction pulse) Ps from the control signal generation unit 87 to be described below are input to the temperature estimation unit 81. The temperature estimation unit 81 generates the temperature estimation result EST based on the temperature detection result Td, the estimation history PREY, and the control signal Ps. The temperature estimation unit 81 may be configured to generate the temperature estimation result EST based on the temperature detection result Td, the estimation history PREY, the control signal Ps, and a voltage (a rated voltage) supplied to the heater 73 if the control signal Ps is in the ON state. The temperature estimation unit 81 outputs the temperature estimation result EST to the estimated temperature memory 82 and the high-frequency component extraction unit 83.

The estimated temperature memory 82 holds a history of the temperature estimation result EST. The estimated temperature memory 82 outputs the estimation history PREY which is the history of the temperature estimation result EST (a previous temperature estimation result EST) to the temperature estimation unit 81.

The high-frequency component extraction unit 83 is a high-pass filter unit that performs a high-pass filtering process of extracting a high-frequency component of the temperature estimation result EST. The high-frequency component extraction unit 83 outputs signal including a high-frequency component HPF obtained from the signal EST and outputs the extracted high-frequency component HPF to the two-signal mixing unit 84.

The two-signal mixing unit 84 performs a two-signal mixing process which is correction of the temperature detection result Td. The temperature detection result Td from the temperature sensor 74 and the high-frequency component HPF from the high-frequency component extraction unit 83 are input to the two-signal mixing unit 84. The two-signal mixing unit 84 corrects the temperature detection result Td based on the high-frequency component HPF. Specifically, the two-signal mixing unit 84 multiplies the high-frequency component HPF by a preset coefficient and adds a multiplication result to the temperature detection result Td to calculate a corrected temperature value WAE. The two-signal mixing unit 84 outputs the corrected temperature value WAE to the difference detection unit 86.

The target temperature setting unit 85 outputs a preset temperature TGT for use as a reference temperature of the difference detection unit 86.

The difference detection unit 86 performs a difference calculation process. The difference detection unit 86 calculates a difference DIF between the target temperature TGT from the target temperature setting unit 85 and the corrected temperature value WAE from the two-signal mixing unit 84 and outputs the difference DIF to the control signal generation unit 87.

The control signal generation unit 87 generates the control signal Ps which is a pulse signal (e.g., conduction pulse) for controlling conduction to the heater 73 based on the difference DIF. The control signal generation unit 87 outputs the control signal Ps to the power circuit 88 and feeds back the control signal Ps to the temperature estimation unit 81.

The power circuit 88 supplies the conduction power PC to the heater 73 based on the control signal Ps. The power circuit 88 performs conduction to the heater 73 of the fixing unit 21 using a voltage supplied from a power conversion circuit (not illustrated).

The power circuit 88 supplies the conduction power PC to the heater 73, for example, by switching a supply state of the voltage from the power conversion circuit to the heater 73 and a non-supply state based on the control signal Ps. That is, the power circuit 88 varies a conduction time of the conduction to the heater 73 of the fixing unit 21 in accordance with the control signal Ps.

The power circuit 88 may be integrated with the fixing unit 21. That is, the power circuit 88 may not supply the control signal Ps to the heater conduction control circuit 14 for input to the heater 73 of the conduction power PC. Instead, the power circuit 88 may supply the control signal Ps directly to the heater 73 of the fixing unit 21.

As described above, the heater conduction control circuit 14 adjusts a power amount for the heater 73 of the fixing unit 21 based on the temperature detection result Td, the temperature estimation history PREV, and the control signal Ps. In this way, the heater conduction control circuit 14 controls a surface temperature of the heat roller 71 heated by the heater 73. This control is referred to a weighted average control with estimate temperature (WAE control). The temperature estimation unit 81, the estimated temperature memory 82, the high-frequency component extraction unit 83, the two-signal mixing unit 84, the target temperature setting unit 85, the difference detection unit 86, and the control signal generation unit 87 of the heater conduction control circuit 14 may be each configured by a thermoelectric circuit, a quasi-electric circuit, an electric circuit representing a thermal transfer model (e.g., an RC circuit), or may be configured by software.

Hereinafter, the WAE control will be described in detail.

Figure 3:
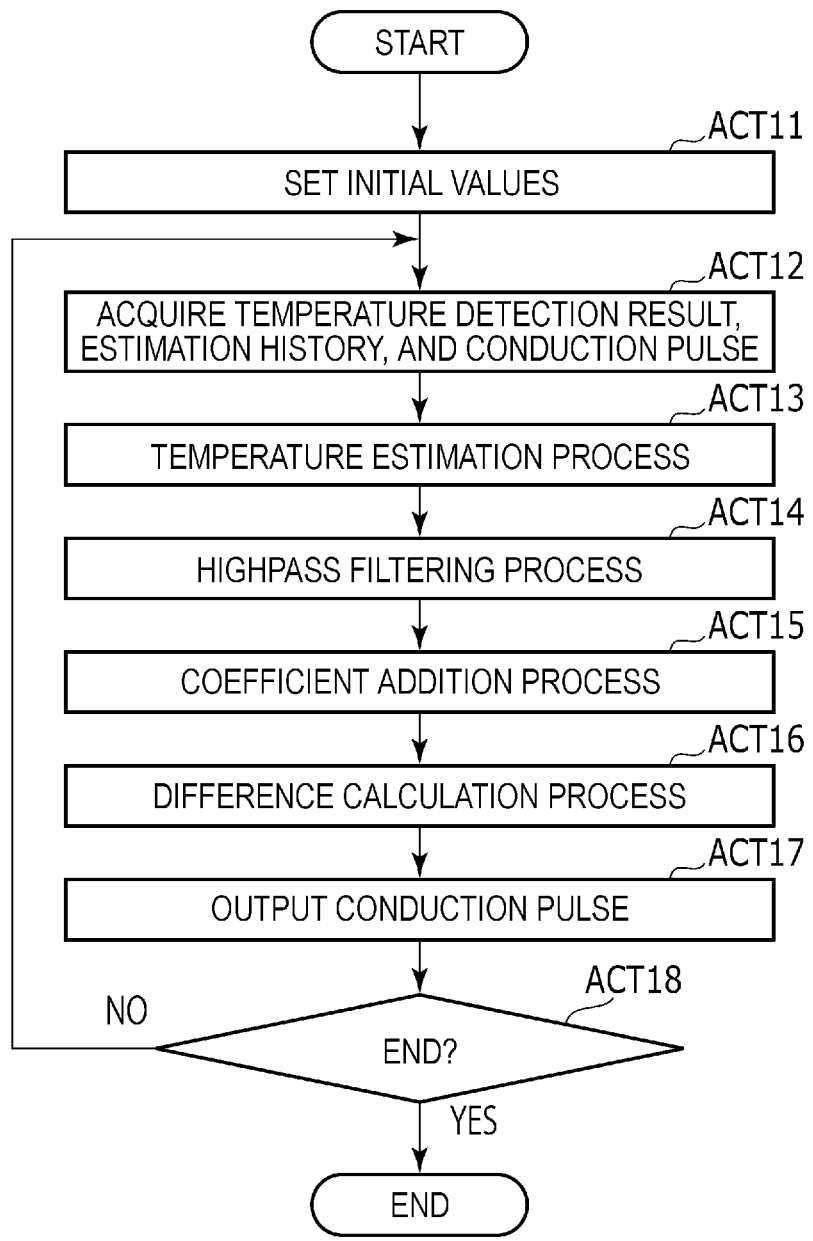
FIG. 3 is a diagram illustrating an example of an operation of the heater conduction control circuit.
Figure 4:
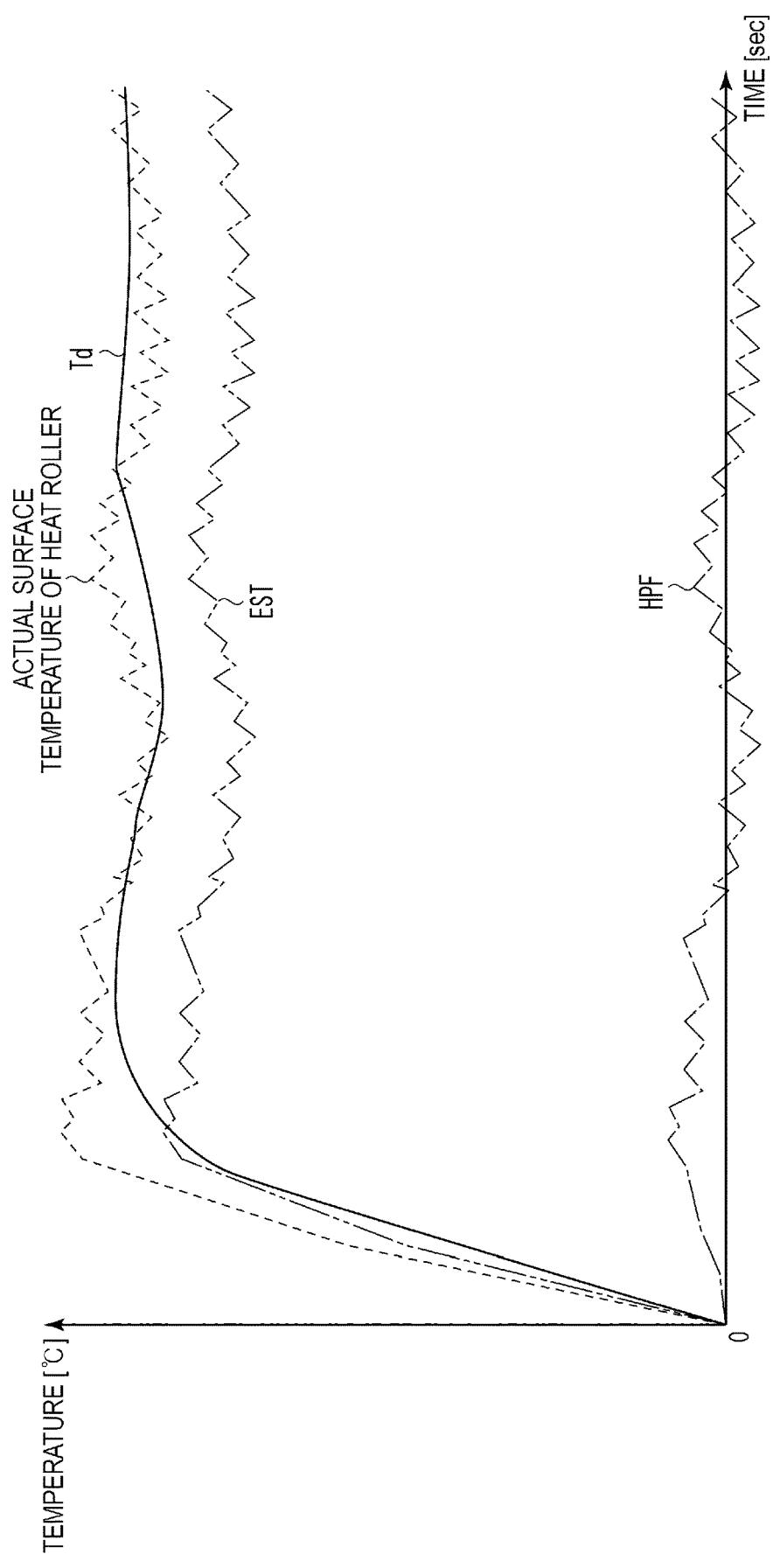
FIG. 4 is a diagram illustrating an example of an operation of the heater conduction control circuit.
Figure 5:
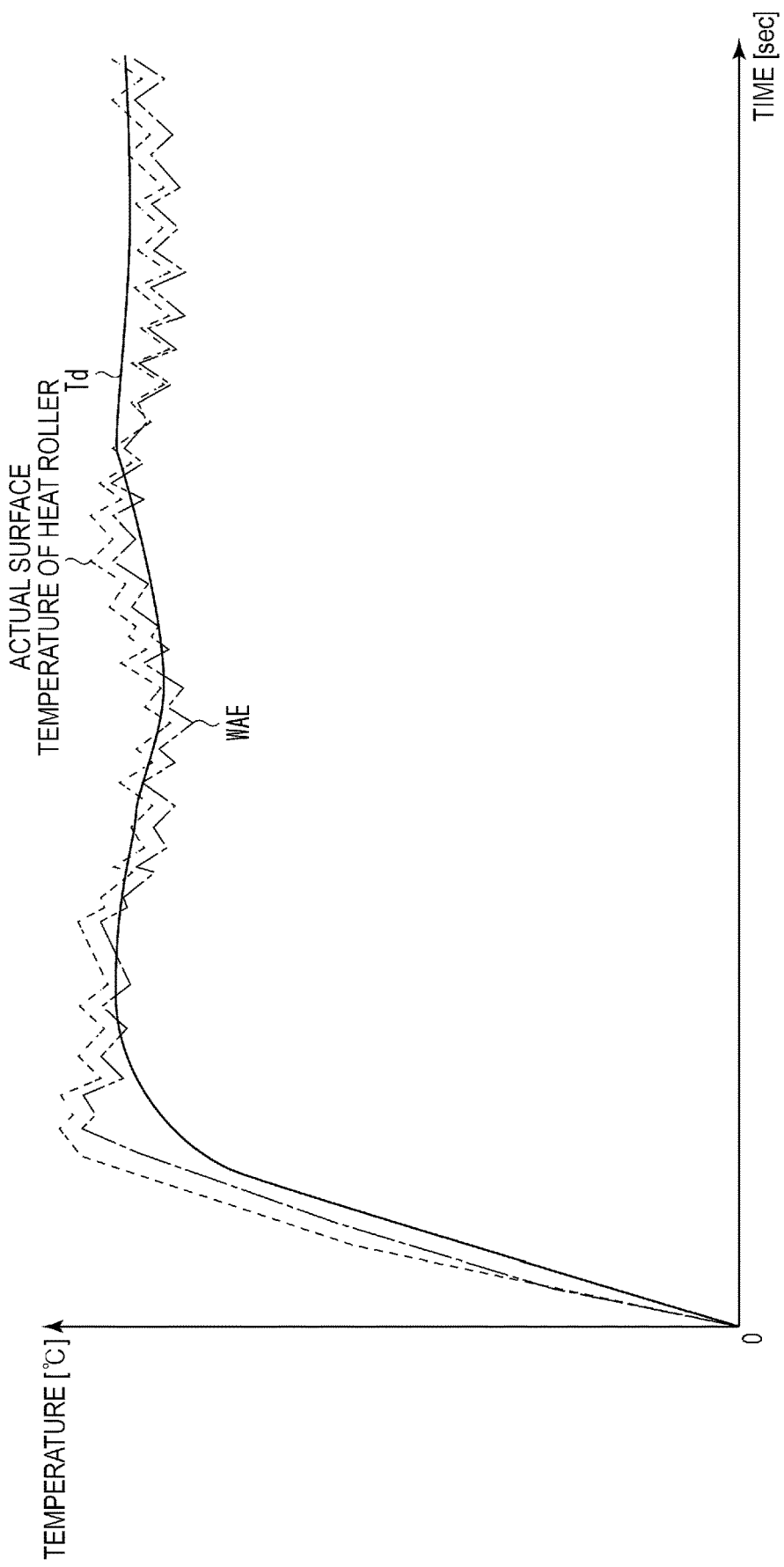
FIG. 5 is a diagram illustrating an example of an operation of the heater conduction control circuit.

FIG. 3 is a flowchart illustrating the WAE control. FIGS. 4 and 5 are diagrams illustrating each signal in the WAE control. In FIGS. 4 and 5, the horizontal axis represents a time. In FIGS. 4 and 5, the vertical axis represents a temperature.

The heater conduction control circuit 14 sets various initial values (ACT11). For example, the heater conduction control circuit 14 sets the coefficient in the two-signal mixing unit 84, the target temperature TGT of the target temperature setting unit 85, and the like based on a signal from the system controller 13.

The temperature estimation unit 81 of the heater conduction control circuit 14 acquires the temperature detection result Td from the temperature sensor 74, acquires the estimation history PREV from the estimated temperature memory 82, and acquires the control signal Ps from the control signal generation unit 87 (ACT12).

As illustrated in FIG. 4, a difference occurs between the temperature detection result Td and an actual surface temperature of the heat roller 71. Since the surface temperature of the heat roller 71 is intermittently heated by the heater 73, the surface temperature changes during a given period. Thus, in the temperature sensor 74, responsiveness of a temperature change may be undesirable in some cases due to characteristics of a thermosensitive material or own heat capacitance. In particular, a cheaper temperature sensor tends to have lower responsiveness. As a result, the temperature detection result Td does not accurately follow the actual surface temperature of the heat roller 71. That is, the temperature detection result Td is detected by the temperature sensor 74 in a state in which the temperature detection result Td is delayed with respect to the surface temperature of the heat roller 71. The temperature detection result Td is detected by the temperature sensor 74 in a state in which a change of the surface temperature of the heat roller 71 is not reproduced and is smooth.

The temperature estimation unit 81 performs a temperature estimation process (ACT13). That is, the temperature estimation unit 81 generates the temperature estimation result EST based on the temperature detection result Td, the estimation history PREY, and the control signal Ps. The temperature estimation unit 81 outputs the temperature estimation result EST to the high-frequency component extraction unit 83 and the estimated temperature memory 82.

The movement of heat can be equivalently expressed by a CR time constant value of an electric circuit.

Heat capacitance is replaced by a capacitor C. Resistance of heat transmission is replaced by a resistor R. Heat source is replaced by a voltage source. The temperature estimation unit 81 estimates a heat quantity given to the heat roller 71 based on a CR circuit in which a value of each element is set in advance based on a conduction amount to the heater 73 and heat capacitance of the heat roller 71. The temperature estimation unit 81 estimates the surface temperature of the heat roller 71 based on the heat quantity given to the heat roller 71, the temperature detection result Td, and the estimation history PREV and outputs the temperature estimation result EST.

In the temperature estimation unit 81, conduction and cutoff from a direct-current voltage source are repeated based on the control signal Ps, the CR circuit operates in response to an input voltage pulse, and an output voltage is generated. Thus, it is possible to estimate heat propagated to the surface of the heat roller 71 which is a control target.

The heat of the heat roller 71 flows out to the outside environment via a space in the fixing unit 21 (the outside of the heat roller 71). Therefore, the temperature estimation unit 81 further includes a CR (capacitor-resistor) circuit that estimates outflow of heat from the heat roller 71 to the outside environment. The temperature estimation unit 81 may further include a CR circuit that estimates a heat quantity flowing from the heat roller 71 to the space inside the fixing unit 21.

As illustrated in FIG. 4, the temperature estimation result EST appropriately follows a change in the actual surface temperature of the heat roller 71. However, since the temperature estimation result EST is a simulation result, there is a possibility of a difference occurring between an absolute value and the actual surface temperature of the heat roller due to a difference in conditions or the like.

The high-frequency component extraction unit 83 performs a highpass filtering process of extracting a high-frequency component of the temperature estimation result EST (ACT14). As illustrated in FIG. 4, the high-frequency component HPF which is a signal indicating a high-frequency component of the temperature estimation result EST appropriately follows a change in the actual surface temperature of the heat roller 71.

The two-signal mixing unit 84 performs a two-signal mixing process which is correction of the temperature detection result Td (ACT15). The two-signal mixing unit 84 multiplies the high-frequency component HPF by a preset coefficient and adds the result of the high-frequency component HPF multiplied by the coefficient to the temperature detection result Td to calculate the corrected temperature value WAE (e.g., WAE=Td+HPF*K, where K is the coefficient). That is, the two-signal mixing unit 84 adjusts the value of the high-frequency component HPF added to the temperature detection result Td with the coefficient to calculate the corrected temperature value WAE.

For example, if the coefficient is 1, the two-signal mixing unit 84 directly adds the high-frequency component HPF to the temperature detection result Td. For example, if the coefficient is 0.1, the two-signal mixing unit 84 adds the value of 1/10 of the high-frequency component HPF to the temperature detection result Td. In this case, the effect of the high-frequency component HPF almost disappears and draws near the temperature detection result Td. For example, if the coefficient is equal to or greater than 1, the effect of the high-frequency component HPF can be expressed more strongly. The coefficient set in the two-signal mixing unit 84 is not a very extreme value and there is a result of an experiment in which a value near 1 is good.

FIG. 5 is a diagram illustrating examples of the actual surface temperature of the heat roller 71, the temperature detection result Td, and the corrected temperature value WAE. In the WAE control, a temperature change of the surface temperature of the heat roller 71 is estimated based on the temperature detection result Td and the high-frequency component HPF of the temperature estimation result EST. Therefore, as illustrated in FIG. 5, the corrected temperature value WAE is a value obtained by appropriately following the surface temperature of the heat roller 71.

The difference detection unit 86 calculates the difference DIF between the target temperature TGT from the target temperature setting unit 85 and the corrected temperature value WAE from the two-signal mixing unit 84 and outputs the difference DIF to the control signal generation unit 87 (ACT16).

The control signal generation unit 87 generates the control signal Ps based on the difference DIF. The control signal generation unit 87 outputs the control signal Ps to the power circuit 88 and the temperature estimation unit 81 (ACT17). The power circuit 88 supplies the conduction power PC to the heater 73 based on the control signal Ps.

The difference DIF shows a relation between the target temperature TGT and the corrected temperature value WAE. For example, if the corrected temperature value WAE>the target temperature TGT, control such as narrowing of the width of the control signal Ps or a decrease in a frequency is performed such that the amount of conduction to the heater 73 is reduced and the surface temperature of the heat roller is lowered. Conversely, if the corrected temperature value WAE<the target temperature TGT, control such as widening of the width of the control signal Ps or an increase in a frequency is performed such that the amount of conduction to the heater 73 is increased and the surface temperature of the heat roller is raised.

From the difference DIF, how much the corrected temperature value WAE and the target temperature TGT are distant can be ascertained as well as the magnitude relation between the corrected temperature value WAE and the target temperature TGT. For example, if the difference DIF (the absolute value) is a large value, a separation between the corrected temperature value WAE and the target temperature TGT may be large. Therefore, the above control may be performed greatly. For example, if the difference DIF (the absolute value) is a small value, the separation between the corrected temperature value WAE and the target temperature TGT is small. Therefore, the above control may be performed gently.

The processor 22 of the system controller 13 determines whether to end the WAE control (ACT18). If the processor 22 determines to continue the WAE control, the process proceeds to ACT12. If the processor 22 determines to end the WAE control, the process of FIG. 3 ends.

As described above, if a process of a certain cycle (the present cycle) is performed, the heater conduction control circuit 14 performs the WAE control based on values at the immediately previous cycle (the control signal Ps and the temperature estimation result EST: the estimation history PREV) and the temperature detection result Ts at the present cycle. That is, the heater conduction control circuit 14 takes over the values at a subsequent cycle. The heater conduction control circuit 14 re-performs the temperature estimation calculation based on the history of the previous calculations. Accordingly, the heater conduction control circuit 14 always performs calculation during an operation. In the heater conduction control circuit 14, the calculation result is held in a memory or the like and is reused in calculation of a subsequent cycle.

Figure 6:
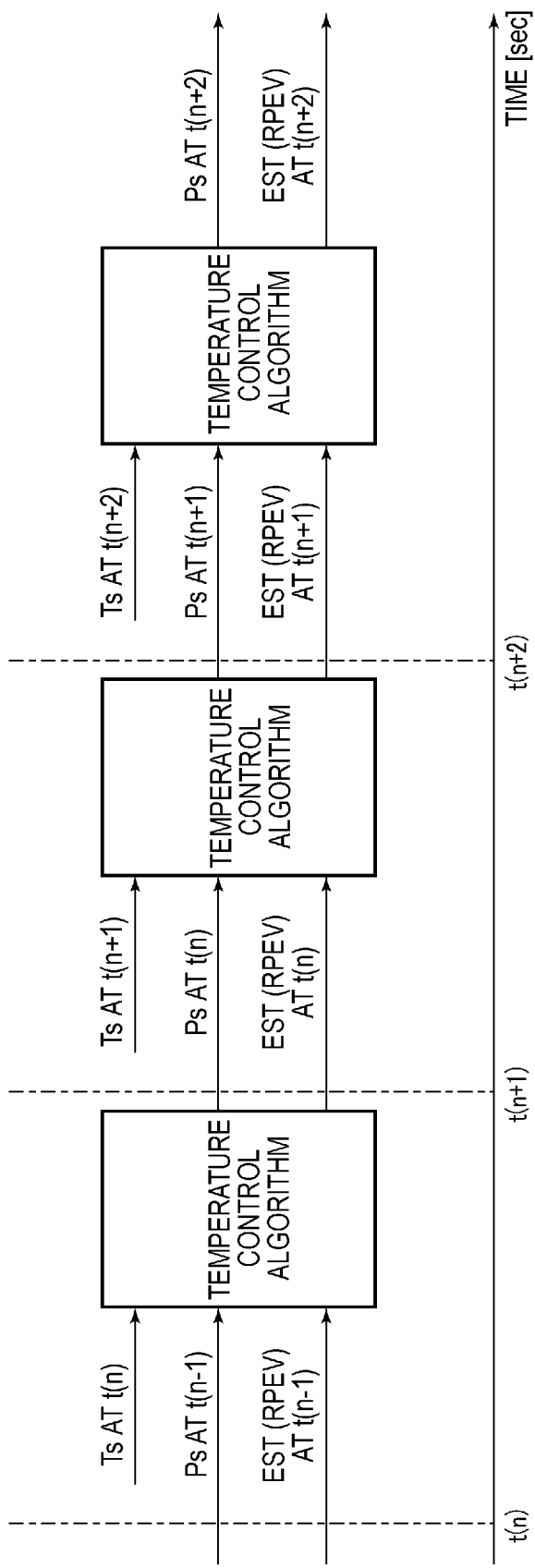
FIG. 6 is a diagram illustrating an example of an operation of the heater conduction control circuit.

FIG. 6 is a diagram illustrating cycles of the process in the heater conduction control circuit 14. In FIG. 6, the horizontal axis represents a time. For example, the temperature estimation unit 81 performs the temperature estimation process at a time t(n), performs the subsequent temperature estimation process at a time t(n+1) progressed by dt, and performs the temperature estimation process at a time t(n+2) further progressed by dt. In this way, the temperature estimation unit 81 repeatedly performs the temperature estimation process. The temperature estimation unit 81 uses the previous temperature estimation result EST to estimate a new temperature in the temperature estimation process of each cycle.

At the time t(n), the temperature detection result Td at the time t(n), the control signal Ps at the previous time t(n−1), and the temperature estimation result EST (the estimation history PREV) at the previous time t(n−1) are input to the temperature estimation unit 81. The temperature estimation unit 81 performs a process based on the input signals and outputs the temperature estimation result EST at the time t(n). The high-frequency component extraction unit 83, the two-signal mixing unit 84, the difference detection unit 86, and the control signal generation unit 87 perform the processes based on the input signals, and the control signal Ps at the time t(n) is output.

At the time t(n+1), the temperature detection result Td newly detected at the time t(n+1), the control signal Ps at the time t(n), and the estimation history PREV which is the temperature estimation result EST at the time t(n) are input to the temperature estimation unit 81. The temperature estimation unit 81 performs a process based on the input signals and outputs the temperature estimation result EST at the time t(n+1). The high-frequency component extraction unit 83, the two-signal mixing unit 84, the difference detection unit 86, and the control signal generation unit 87 perform the processes based on the input signals, and the control signal Ps at the time t(n+1) is output.

At the time t(n+2), the temperature detection result Td newly detected at the time t(n+2), the control signal Ps at the time t(n+1), and the estimation history PREV which is the temperature estimation result EST at the time t(n+1) are input to the temperature estimation unit 81. The temperature estimation unit 81 performs a process based on the input signals and outputs the temperature estimation result EST at the time t(n+2). The high-frequency component extraction unit 83, the two-signal mixing unit 84, the difference detection unit 86, and the control signal generation unit 87 perform the processes based on the input signals, and the control signal Ps at the time t(n+2) is output.

The above time interval dt may be a fixed value or may be set in the setting of the initial values in ACT11. For example, the time interval dt is set to 100 [msec].

As described above, the image forming apparatus 1 includes the fixing unit 21 that includes the heat roller 71 heating the toner images to be formed on a medium and fixing the toner images to the medium and the heater 73 heating the heat roller 71, and the temperature control device (the heater conduction control circuit 14). The heater conduction control circuit 14 controls the temperature of the heat roller 71 to which heat propagates from the heater 73 by supplying power to the heater 73. The heater conduction control circuit 14 includes the temperature estimation unit 81 that estimates the temperature of the heat roller 71 based on the conduction to the heater 73. The heater conduction control circuit 14 includes the control signal generation unit that outputs the control signal for controlling the power supplied to the heater based on the temperature estimation result and the temperature detection result of the heat roller 71 by the temperature sensor 74.

In this configuration, the temperature control device can follow the surface temperature of the heat roller 71 based on the temperature estimation result even if responsiveness of temperature detection of the heat roller 71 by the temperature sensor 74 is bad. Thus, it is possible to reduce cost of the temperature sensor 74 and prevent overshoot and temperature ripple from occurring.

The control signal generation unit 87 performs weighted average of the temperature estimation result and the temperature detection result of the heat roller 71 by the temperature sensor 74 and outputs a control signal for controlling the power supplied to the heater 73 based on a weighted average result.

The image forming apparatus 1 further includes the high-frequency component extraction unit 83 that extracts the high-frequency component of the temperature estimation result. The control signal generation unit 87 outputs a control signal based on the temperature detection result and the high-frequency component. Thus, it is possible to estimate a temperature change of the surface temperature of the heat roller 71 based on the high-frequency component of the temperature estimation result while accurately estimating the absolute value of the surface temperature of the heat roller 71 based on the temperature detection result. Thus, it is possible to perform conduction to the heater 73 based on a result obtained by accurately estimating the surface temperature of the heat roller 71. As a result, it is possible to prevent overshoot and temperature ripple from occurring.

The functions described in the above-described embodiments can also be realized using not only hardware but also software by causing a computer to read and execute a program describing each function. Each function may be realized by appropriately selecting any of software and hardware.

While certain embodiments have been described, these embodiments have been presented by way of example only, and are not intended to limit the scope of the inventions. Indeed, the novel embodiment described herein may be embodied in a variety of other forms. Furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A temperature control device for controlling a temperature of a temperature control target to which heat propagates from a heater by supplying power to the heater via a conduction pulse, the device comprising a control circuit configured to:
   estimate the temperature of the temperature control target based on conduction to the heater; and
   cause the conduction pulse to be supplied to the heater based on a temperature estimation result and a temperature detection result of the temperature control target by a temperature sensor.

2. The device according to claim 1, wherein the control circuit is further configured to:
   extract a high-frequency component of the temperature estimation result, and
   generate the conduction pulse based on the temperature detection result and the high-frequency component.

3. The device according to claim 1, wherein the control circuit is further configured to:
   extract a high-frequency component of the temperature estimation result, and correct the temperature detection result based on the high-frequency component.

4. The device according to claim 3, wherein the control circuit is further configured to:
determine a target temperature of the temperature control target;
compare the target temperature to the corrected temperature to determine a difference; and
cause the conduction pulse to be generated based on the difference.

5. The device according to claim 1, wherein the control circuit is further configured to estimate the temperature of the temperature control target based on the conduction pulse and a capacitor-resistor circuit in which heat capacitance of the temperature control target is replaced by a capacitor and resistance of heat transmission is replaced by a resistor.

6. The device according to claim 1, wherein the control circuit is further configured to generate the conduction pulse based on a history of the temperature estimation result, conduction to the heater, and the temperature detection result.

7. A method of controlling a temperature of a temperature control target to which heat propagates from a heater by supplying power to the heater via a conduction pulse, the method comprising:
estimating a temperature of the temperature control target based on conduction to the heater; and
generating the conduction pulse to be supplied to the heater based on a temperature estimation result and a temperature detection result of the temperature control target by a temperature sensor.

8. The method according to claim 7, further comprising:
extracting a high-frequency component of the temperature estimation result, and
generating the conduction pulse based on the temperature detection result and the high-frequency component.

9. The method according to claim 7, further comprising:
extracting a high-frequency component of the temperature estimation result, and
correcting the temperature detection result based on the high-frequency component.

10. The method according to claim 7, further comprising:
determining a target temperature of the temperature control target;
comparing the target temperature to the corrected temperature to determine a difference; and
generating the conduction pulse based on the difference.

11. The method according to claim 7, further comprising estimating the temperature of the temperature control target based on the conduction pulse and a capacitor-resistor circuit in which heat capacitance of the temperature control target is replaced by a capacitor and resistance of heat transmission is replaced by a resistor.

12. The method according to claim 7, further comprising generating the conduction pulse based on a history of the temperature estimation result, conduction to the heater, and the temperature detection result.

13. An image forming apparatus comprising:
a fixing unit including:
a fixing rotator configured to heat a toner image formed on a medium and fix the toner image to the medium, and
a heater configured to heat the fixing rotator; and
a temperature controller configured to control a temperature of the fixing rotator to which heat propagates from the heater by supplying power to the heater via a conduction pulse, the temperature controller being configured to:
estimate the temperature of the fixing rotator based on conduction to the heater, and
cause the conduction pulse to be supplied to the heater based on a temperature estimation result and a temperature detection result by a temperature sensor.

14. The image forming apparatus according to claim 13, wherein the control circuit is further configured to:
extract a high-frequency component of the temperature estimation result, and
generate the conduction pulse based on the temperature detection result and the high-frequency component.

15. The image forming apparatus according to claim 13, wherein the control circuit is further configured to:
extract a high-frequency component of the temperature estimation result, and
correct the temperature detection result based on the high-frequency component.

16. The image forming apparatus according to claim 15, wherein the control circuit is further configured to:
determine a target temperature of the fixing rotator;
compare the target temperature to the corrected temperature to determine a difference; and
generate the conduction pulse based on the difference.

17. The image forming apparatus according to claim 13, wherein the control circuit is further configured to estimate the temperature of the fixing rotator based on the conduction pulse and a capacitor-resistor circuit in which heat capacitance of the fixing rotator is replaced by a capacitor and resistance of heat transmission is replaced by a resistor.

18. The image forming apparatus according to claim 13, wherein the control circuit is further configured to generate the conduction pulse based on a history of the temperature estimation result, conduction to the heater, and the temperature detection result.

19. The image forming apparatus according to claim 13, wherein the fixing rotator is a heat roller comprising a core bar formed of a hollow metal and an elastic layer formed on the outer circumferential surface of the core bar.

20. The image forming apparatus according to claim 19, wherein the heater is disposed inside the core bar and is configured to generate heat inside the core bar to be transmitted to the elastic layer.

* * * * *